United States Patent
Hall et al.

(10) Patent No.: US 10,405,317 B2
(45) Date of Patent: *Sep. 3, 2019

(54) HUBS AND SYSTEMS FOR INTERMEDIATE-RANGE MULTI-CHANNEL WIRELESS NETWORKS EMPLOYING END-DEVICE TYPE MANAGEMENT

(71) Applicants: David R. Hall, Provo, UT (US); Craig Boswell, Draper, UT (US); Everett D. Robinson, Pleasant Grove, UT (US)

(72) Inventors: David R. Hall, Provo, UT (US); Craig Boswell, Draper, UT (US); Everett D. Robinson, Pleasant Grove, UT (US)

(73) Assignee: Hall Labs LLC, Provo, UT (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/413,734

(22) Filed: Jan. 24, 2017

(65) Prior Publication Data

US 2018/0213522 A1   Jul. 26, 2018

(51) Int. Cl.
| | | |
|---|---|---|
| *H04W 72/04* | (2009.01) | |
| *H04L 12/44* | (2006.01) | |
| *H04W 76/11* | (2018.01) | |
| *H04L 12/28* | (2006.01) | |
| *H04W 60/00* | (2009.01) | |
| *H04L 29/08* | (2006.01) | |
| *H04W 84/12* | (2009.01) | |

(52) U.S. Cl.
CPC ....... *H04W 72/048* (2013.01); *H04L 12/2803* (2013.01); *H04L 12/44* (2013.01); *H04W 60/00* (2013.01); *H04W 76/11* (2018.02); *H04L 67/125* (2013.01); *H04W 84/12* (2013.01)

(58) Field of Classification Search
CPC ....... H04L 12/44; H04L 67/12; H04L 67/125; H04L 12/28; H04L 12/2803; H04L 12/66; H04W 72/04; H04W 72/048; H04W 74/06; H04W 76/11; H04W 84/12; H04W 60/00; H04W 72/0413

See application file for complete search history.

(56) References Cited

U.S. PATENT DOCUMENTS

| 2012/0173905 A1* | 7/2012 | Diab | H04L 12/66 713/320 |
| 2013/0229996 A1* | 9/2013 | Wang | H04W 72/0413 370/329 |
| 2017/0006533 A1* | 1/2017 | Gould | H04L 12/28 |

\* cited by examiner

*Primary Examiner* — Khoa Huynh (57) ABSTRACT

Low data rate wireless electronic devices utilizing a hub- or star-based network topology, operational at ranges of thousands of meters. Remote end-devices may be such things as keypads, door latches, occupancy monitors, sprinkler controllers and other devices controlled or monitored in a campus or a collection of buildings. End-devices operate at intermediate ranges in RF congested areas and failure-intolerant situations through the use of discrete programmable channels. Each end-device may carry a unique identifier and type information that facilitates the assignment of an operational channel assignment from the hub, without a configuring or programming step at the end-device by an installing person. A hub uses end-device type information to make channel assignments, conserving communications channel resources. Detailed information on various example embodiments of the inventions are provided in the Detailed Description below.

20 Claims, 6 Drawing Sheets

HUBS AND SYSTEMS FOR INTERMEDIATE-RANGE MULTI-CHANNEL WIRELESS NETWORKS EMPLOYING END-DEVICE TYPE MANAGEMENT

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g. lighting, temperature, digital video recorders, and many other "smart" devices. That kind of device ordinarily requires a connection to a network switch or hub, which connection can be wired or wireless.

Wireless connections to such smart devices are often desired, particularly in existing constructions, avoiding the laying of wires in existing walls and other structures. Technologies serving this purpose include low-wattage devices that communicate using the 2.4 GHz 802.11b/g "WiFi" protocol, and other more-recent and similar protocols such as Zigbee and Z-Wave. These protocols generally permit data rates of 100 k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The existing intermediate-range techniques, however, aren't conducive for applications where interactivity is need. For a channel sharing thousands of meters, it isn't necessary to resolve collisions between devices in a matter of milliseconds, because data transmissions can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

BRIEF SUMMARY

Disclosed herein are low data rate wireless electronic devices utilizing a hub- or star-based network topology, operational at ranges of thousands of meters. Remote end-devices may be such things as keypads, door latches, occupancy monitors, sprinkler controllers and other devices controlled or monitored in a campus or a collection of buildings. End-devices operate at intermediate ranges in RF congested areas and failure-intolerant situations through the use of discrete programmable channels. Each end-device may carry a unique identifier and type information that facilitates the assignment of an operational channel assignment from the hub, without a configuring or programming step at the end-device by an installing person. A hub uses end-device type information to make channel assignments, conserving communications channel resources. Detailed information on various example embodiments of the inventions are provided in the Detailed Description below, and the inventions are defined by the appended claims.

DETAILED DESCRIPTION

Figure 1:
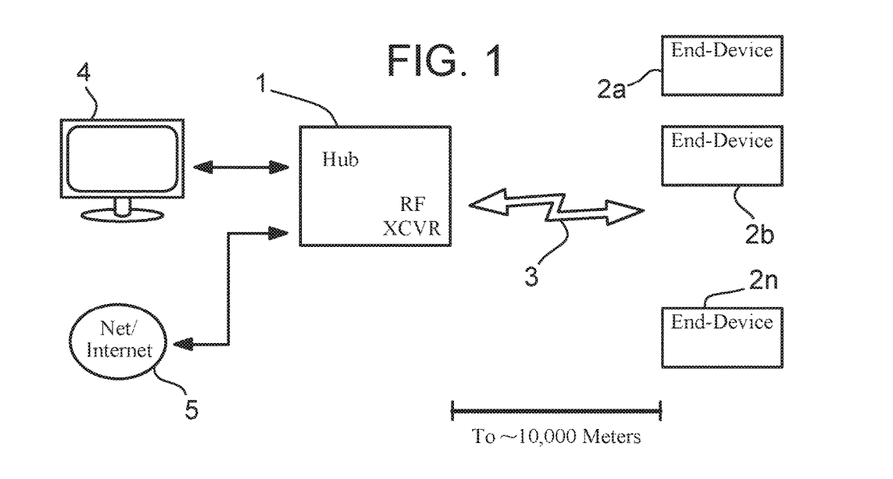
FIG. 1 depicts a network topology utilizing multiple end-devices and an interactive hub.

Shown in FIG. 1 is an exemplary network topology where the claimed inventions can serve particularly well. A hub 1 is placed within wireless range of end-devices 2a-n, communicating 3 over the airwaves at a distance of up to 10 KM or more, depending upon environmental conditions. In many cases, end-devices 2 are electronic devices that accept commands and transmit information to a controlling hub 1. Included in hub 1 and each of end-devices 2a-n is a processor, software for performing the functions of the device, and an RF transceiver. Hub 1 could be an ordinary personal computer with an RF adapter or card installed, or it might simply look like a box with an antenna and a port or interface permitting configuring and monitoring; it is foreseen that a manufacturer would likely supply a hub 1 in a ready-to-use state such that an installer need not open its case or install any software. In one configuration, hub 1 is connectable to a personal computer 4, for example through a USB interface, computer 4 having installed thereon software functional to configure and monitor the hub 1. In another configuration, hub 1 has a network port whereby communications may be had with network 5. These communications may be through any conceivable type or protocol. In one example a hub 1 sends messages through a TCP/IP sockets-based protocol to a proprietary server existing on the network 5. In another example, hub 1 has software that permits it to be seen as an HTTP server from any device on network 5. Thus in some installations, hub 1 may be connected directly to and accessible from the Internet, allowing for access from any Internet-connected device. The antenna of hub 1 will typically be elevated and located in an obstruction-free locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing many kinds of control and sensing functions. In one example, an end-device has an infra-red motion sensor built in, includes programming to record the time of the last motion event, and may also include programming to initiate a notification packet to a hub 1 upon a motion-sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction of hub 1 without human intervention based upon thermostat data forwarded through hub 1. The kinds of end-devices 2 that can be employed are virtually limitless, so long as they are electronic and provide either a control or a sensing function while staying within the available data throughput limitations.

Figure 2:
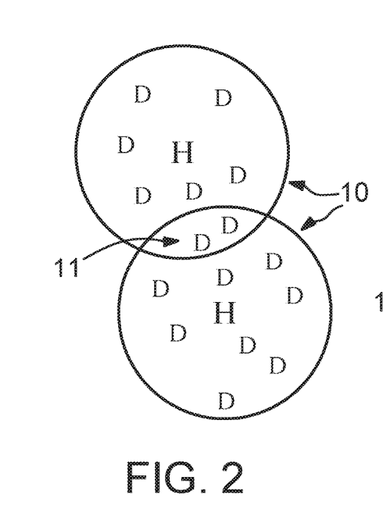
FIG. 2 depicts potential interference in two proximal short-range wireless networks.

Now turning to FIG. 2, two proximal short-range networks are conceptually shown, such as those constructed from devices communicating through the 802.11g protocol, for example using the Zigbee specification. In the example two property owners each operate a hub "H" servicing multiple devices "D", and as shown in the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

Figure 3:
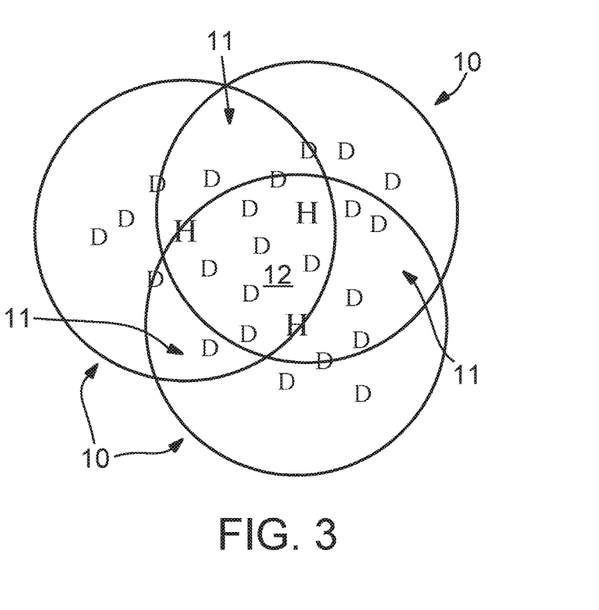
FIG. 3 depicts potential interference in three proximal intermediate-range wireless networks.

In contrast and as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used, most communication between hubs and devices should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11b/g network is now so popular that in most urban areas there is a router within communicative range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

Intermediate-Range Packets and Transferrence Basics

Review.

Described herein are electronic devices that are functional at intermediate ranges even in populated or congested areas, providing for simple installation by an ordinary home- or business-owner, as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g. with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org.

Figure 4:
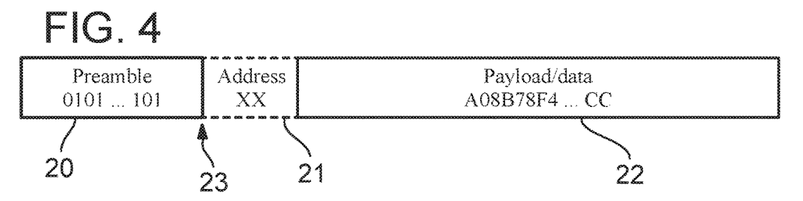
FIG. 4 shows an exemplary wireless data packet structure that includes a preamble and a variable payload.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. (A description of what defines a channel appears below.) Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmit using many modulation techniques; LoRa devices use frequency shift keying for interference immunity, although other modulations can be used in accordance with the dictates of a particular operating environment.

Figure 5:
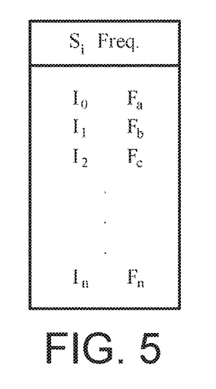
FIG. 5 illustrates an exemplary frequency-sequence table usable in digital spread-spectrum communications between a hub and an end-device.

Packets can be transmit over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is a sequence of frequencies uniformly spread over a given available set. This can be accomplished by the inclusion of a table as shown in FIG. 5, containing a sequence of n frequencies. In the example, each frequency $F_x$ is indexed by a sequence number $I_n$, such that the current operational frequency can be determined as a function of time from a point of synchronization, for example the end 23 of the preamble of a packet as in FIG. 4. The arrangement of frequencies in a sequence may be incremental, random, or in any order desired, keeping in mind that use of each frequency an equal number of times will result in the desired uniformity.

Figure 6:
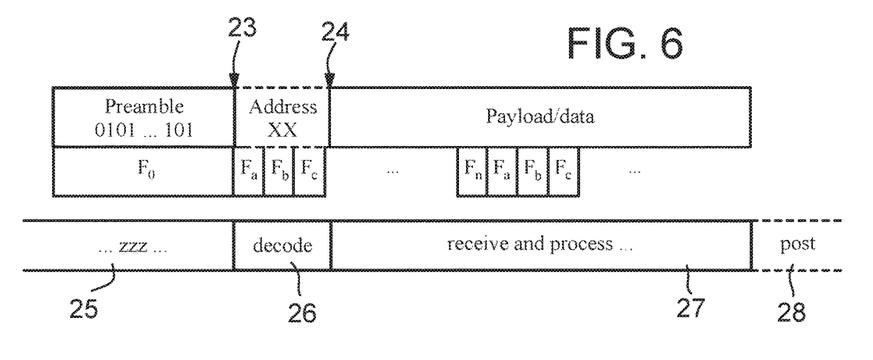
FIG. 6 depicts typical power states of an end-device through the course of reception of one kind of intermediate-range wireless packet.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer; when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet, where it will be transited across a channel first before a data body. Where an address is matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Multi-Channel Intermediate-Range Implementations

Existing intermediate-range networks use a common initial DSS frequency and/or channel for communications with devices in that network. This method has the advantage of making setup extremely simple. By this method, other networks may use other initial frequencies or channels, thereby discriminating between members of their respective networks. As such networks change to include interactive devices or grow to large numbers of member devices, the possibility of congestion, collisions and interference becomes a greater concern.

Figure 8:
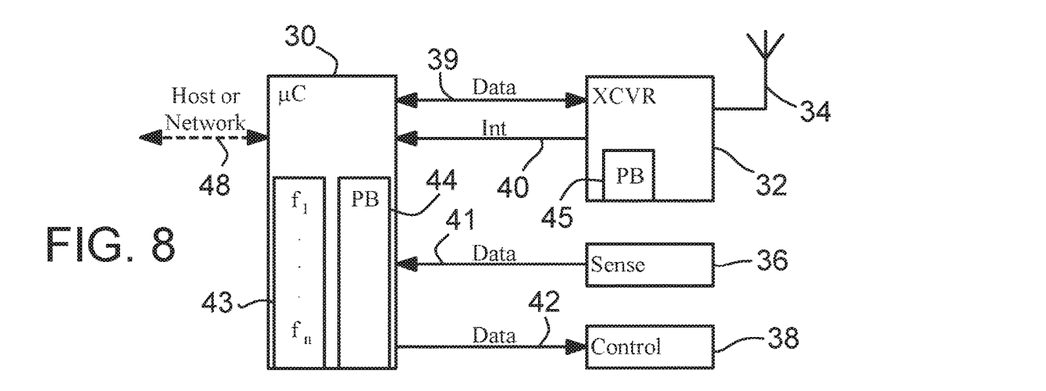
FIG. 8 shows an exemplary circuit architecture suitable for an ordinary end-device.

Now turning to FIG. 8, a basic circuit is shown typical of many present intermediate-range network devices, which can support either single- or multiple-channel operation. The main parts of this circuit are a microcontroller 30 and an RF transceiver 32, which is connected to an antenna 34 located in a position to provide clear communications to other devices. A transceiver 32 may be essentially some analog radio-frequency circuits combined with a logic state machine that permits automatic operation for all or part of a packet transmission or reception. The use of transceiver 32 may leave the microcontroller 30 with additional processing capacity for such things as reading sensors, managing control circuits, etc., which may happen at the same time that packets are transiting a communications channel. Communication between the microcontroller and the transceiver is by way of data lines 39 and interrupt lines 40, by which microcontroller 30 manages the functions of transceiver 32 and transfers packet information received and to be sent. Transceiver has a packet buffer 45 sufficient to store all or part of a single packet, read- and write-accessible through data lines 39. Data lines 39 can be varied according to need or capabilities of a transceiver used, while interrupt lines 40 signal to the microcontroller events such as the start or completion of reception of an incoming packet. Were transceiver 32 to be a Semtech SX127x (introduced below), for example, data would be transferred by way of a single-bit wide serial bus using address locations to control registers and access a packet buffer, and data lines 39 would include single lines for in, out, clock and sync. In that example, a packet completion interrupt would be generated by a transition on the DIO0 line. When transceiver 32 is configured for operation on a channel orthogonal to those used by other end-devices, such interrupts would not occur when those end-devices communicate and microcontroller 30 would be left free to sleep or engage in other processing activity.

Microcontroller 30 also contains a packet buffer 44, which is typically larger than the transceiver buffer 45. As packets are to be transmitted, the microcontroller transfers them to the transceiver by way of data lines 39, typically one at a time. Packets received are correspondingly transferred from buffer 45 over the data lines and stored for processing in buffer 44. Apart from this packet data, setup commands are also be sent by microcontroller 30 to program the transceiver for proper operation on a channel, once at initialization for single-channel operation and subsequently between packets where more than one channel is used. Where microcontroller 30 has been programmed for multi-channel operation, each packet within buffer 44 may carry with it a channel on which it is to be sent, or parameters thereof.

In an implementation using the Semtech SX127x and digital spread-spectrum, microcontroller 43 also contains a frequency table 43, as described above for FIG. 5. For that implementation, the transceiver 32 has storage only for two frequency settings, which are the one presently in use and the one to be used when it is time for a hop to a new frequency. The transceiver generates interrupts to the microcontroller indicating it is ready to receive the new frequency setting, which is subsequently sent over data lines 39 before the frequency hop is to occur. An alternate configuration would put frequency table 43 entirely on the transceiver 32, but for this example a simplified transceiver is used that does not.

Where a transceiver 32 and microcontroller 30 pair is incorporated into an end-device, at least one of a sensor 36 or a controller 38 will be included. Sensor 36 could be virtually any sensor, examples of which are a temperature probe, a keypad, a lighting sensor, an entryway closure detector, a motion detector, and a camera. Controller 38 could control a latch, a power switch, a thermostat, a motor speed controller, and many other things. Sensor 36 and controller 38 are connected to microcontroller 30 through data lines 41 and 42, which lines may be of any needed configuration, analog or digital. Where a transceiver 32 and microcontroller 30 pair is incorporated into a hub, sensor 36 and controller 38 may be omitted. Instead, a connection to a host processor or network 48 would be included, permitting configuration of and interactions with end-devices at intermediate-range.

While functioning as an end-device, one microcontroller 30 paired with one transceiver 32 are sufficient to operate in an ordinary way. Transceiver 32 is capable of being configured for a desired channel and transmitting or receiving packets to and from a hub, though not at the same time. However, end-devices do not typically have a need to do both concurrently, so this is usually not an issue. However there are advantages to incorporating multiple transceivers in a hub, as will be presently explained.

Figure 9:
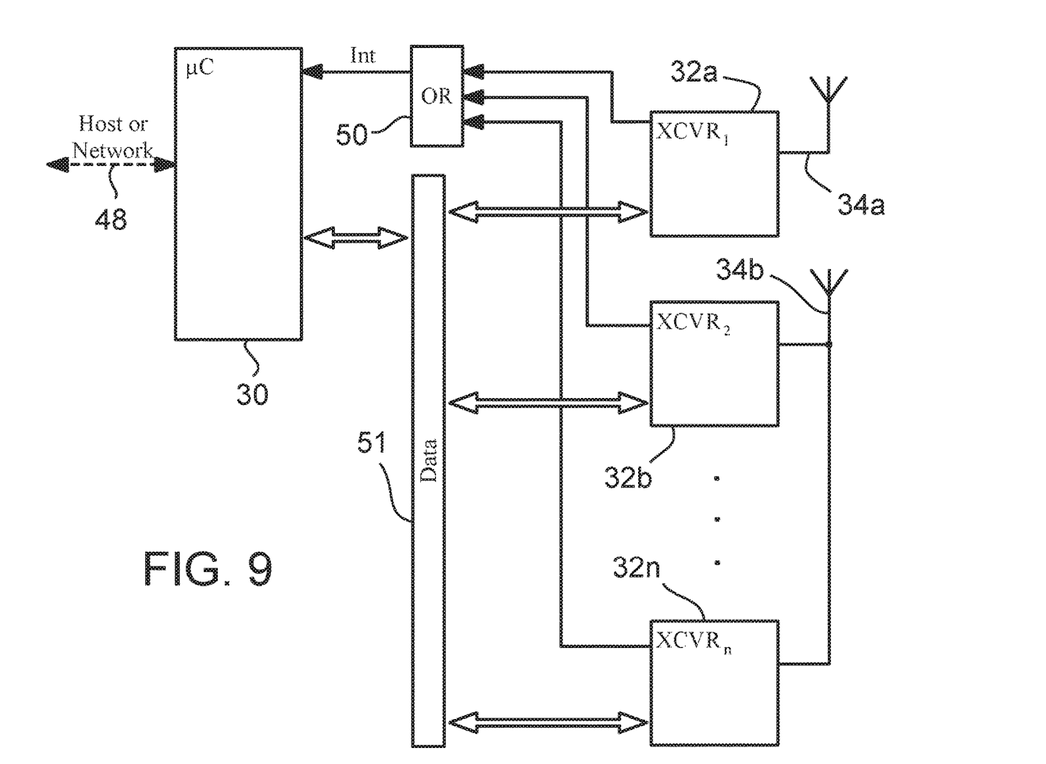
FIG. 9 shows an exemplary circuit architecture suitable for a hub having one transmitter and a number of receivers for simultaneous operation on differing channels.

FIG. 9 illustrates one configuration that may be used in a hub, providing multiple transceiver functionality. Here a microcontroller 30 is connected to n transceivers 34a through 34n by way of an interrupt gate 50 and data bus 51. Included within data bus 51 is sufficient multiplexing circuits to allow the microcontroller 30 to individually address each transceiver. In the example where the Semtech SX127x transceivers are used, this may be done by dropping the NSS pin of the individual transceiver to be attended to. Interrupt gate 50 combines the interrupt signals of each of the transceivers such that any interrupt in the group interrupts the microcontroller, and code therein can identify the particular transceiver flagging the interrupt and take appropriate action. In the drawing gate 50 is an OR logic gate, which suffices when all interrupt lines are low in a normal (non-interrupt) state; gate 50 could be AND logic gate if the reverse were true (lines normally high with low signal indicating an interrupt), or gate 50 could be a combination of logic circuits if needed. Now in practice it may be there are a sufficient number of interrupt inputs and general I/O pins on microcontroller 30 such that gate 50 and bus 51 aren't needed, particularly where the number of transceivers n is kept small, allowing for the microcontroller to communicate using parallel lines duplicating the setup and methods of FIG. 8.

The exemplary hub of FIG. 9 has the capability of transmitting and receiving wirelessly with end-devices at the same time, through antennas 34a and 34b. Antenna 34b is connected as an input to each of transceivers 32b through 32n, allowing each transceiver to receive on a different channel as programmed from the microcontroller 30. Depending upon the type of transceiver used, each transceiver may be isolated through filters and amplifiers (not shown) such that the proper impedance at the operational frequency range is preserved. Note that such a tying of transceivers to a common antenna makes them ineffective for concurrent operations in a transmitting mode; therefore microcontroller 30 would be configured to keep them in receiving-mode only. In contrast antenna 34a and transceiver 32a are configured to transmit and receive, having no sharing of antenna resources. Consideration should be given to shielding and to the distance between an antenna that may be used for transmitting and others that may be used for reception, such that potential interference is avoided.

The example shown in FIG. 9 has the capability of transmitting and receiving at the same time, with n−1 receivers monitoring one channel each. Transceiver 32a can be transmitting while all of 32b-n are ready to receive packets as they may transit n−1 channels. Microcontroller 30 may use the transceiver capable of free transmit operation 32a to perform interactive communication with an end-device without channel reprogramming, alternating between sending and receiving over the same channel. Alternatively, when using interactive communication with a particular end-device, microcontroller 30 may command transceiver 32a to switch to different channels as needed for transmissions to other end-devices, allowing one of transceivers 32b-n to receive the next packet from the particular end-device. If this is done, it is preferred that any transceivers configured to receive on the same channel be turned off, so as to avoid the discarding of packets produced at the hub. Assuming interactions with an end-device are symmetric (packets to and from an end-device alternate and are of the same length), in theory the setup shown in FIG. 9 will support up to two concurrent interactive sessions with two end-devices while at the same time monitoring n−2 other lone-channel end-devices for alerting packets sent spontaneously, or more than that number of end-devices where such channels are shared (using the asynchronous mode described below, for example.)

In practice, the constraints on the number of transceivers that can be used will depend upon several factors. One of these is the speed of data bus 51 against the efficiency of commanding transceiver setup, and sending and receiving packet data. As most of the transceivers of the setup of FIG. 9 are used to receive, this limitation would be experienced in two main ways. First, it is possible to flood the system with incoming spontaneous packets such that they cannot be retrieved with sufficient speed across bus 51. The second way comes into play when single receivers 32 are each used to monitor multiple channels, for example when the number of monitored channels exceeds n−1. The reprogramming of a transceiver 32 across the bus 51 requires some time, and if that time exceeds the packet preamble length, packets will fail to be received. Where more than two channels are monitored by a single transceiver 32, the dwell time on a channel (to detect whether a packet transmission is in progress by an end-device) may further exacerbate this problem.

Another limitation of the setup of FIG. 9 relates to the use of a single transmitter. For example, interactive communication can be had with not more than two end-devices where that communication is symmetric. Thus if an event occurs that requires a simultaneous response to multiple end-devices, some of those responses may be delayed beyond a timeout period. This problem can be mitigated through the addition of more transceiver/antenna pairs, if those antennas can be placed at a sufficient distance from the receiving ones and if regulations allow.

Wireless Channels, Orthogonality and Communications Principles

A wireless frequency spectrum can be segmented into definite channels that reduce interference and avoid unnecessary receiver power-up events on non-destination devices. Such channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided into 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones are used in this description merely out of convenience as a basis for discussion. The SX127x products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Figure 7:
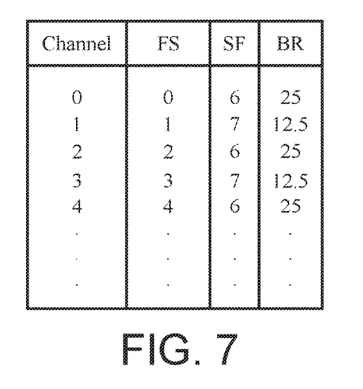
FIG. 7 shows an exemplary set of discrete and orthogonal wireless channels for communication between a hub and a set of end-devices.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant of long latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Assignment of Operational Channels from a Hub

Dynamic channel assignment is also possible, that is channel assignments made at the time of use rather than manufacture. One method uses a dedicated default channel and negotiation, by which channel assignments may be made substantially without an ordinary consumer, that is a property owner, electrician or maintainer with ordinary skills, applying configuration steps beyond plugging an end-device in and registering it in an intermediate network. A dedicated channel is selected from a list of available ones, where each end-device starts on or returns to when there is a lack of confidence in a present channel assignment. Particular channel assignments are managed by the hub to which an end-device is to be paired, which assignments can be by several means as discussed below. The procedure to which channel assignments are negotiated depends upon whether communications with an end-device are prompted or spontaneous, or in other terms synchronous or asynchronous with respect to hub communication on the default channel.

In synchronous mode, all communications from end-devices are made in response to a request or permission from a hub. A hub transmits a packet to each end-device in turn, granting (explicitly or implicitly) the end-devices a window in which to respond. In analogy, the hub acts as a chairperson to a room full of speakers, the chair deciding who should speak and when, each end-device only "speaking when he's spoken to". In asynchronous mode, an end-device sends a packet when it is ready, potentially at the same time as another end-device that causes a packet collision. A hub responds to an end-device with a packet acknowledging (again either explicitly or implicitly) receipt of the end-device's communication. After a time, if a transmitting end-device does not receive that acknowledgment, it may retransmit the packet as many times as needed. This is analogous to a room full of people who may potentially speak to a chairperson whenever they wish to "out-of-order". Either mode of communication can be used on a default channel, and indeed a hub can be designed that uses only one mode or switches between both, depending upon the need.

Figure 10:
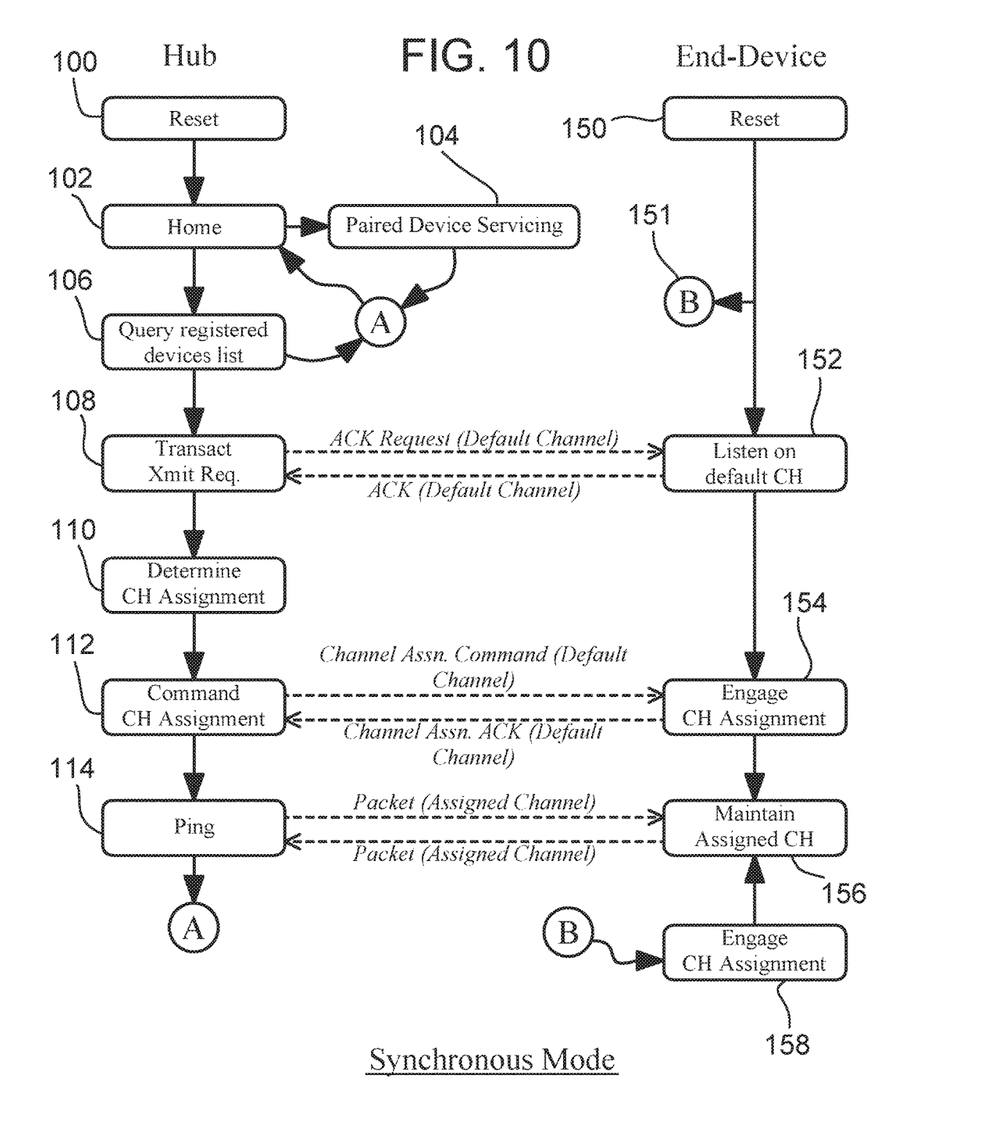
FIG. 10 depicts a typical set of states for a hub and an end-device being configured from a default initialization channel in synchronous mode to operate on an assigned channel.

Now depicted in FIG. 10 are state-machine representations of a channel negotiation between a hub and an end-device using a synchronous mode, with successive states generally proceeding down the page. Each starts in a reset state on power-on, 100 and 150 for the hub and end-device, respectively. On reset 150 the end-device completes some initialization activity, after which one of two things happens. If the end-device has non-volatile memory and if a channel assignment is found to be stored therein, the device can skip 151 the channel assignment procedure and simply set up the communications hardware for the saved channel and resume operation as in step 158. Otherwise the device enters a state of listening for an acknowledgment request on the default initialization channel 152. The end-device may leave this listening state intermittently or as needed to manage other needs, as responding to such a request is not a critical action. As an acknowledgment request is first used by the hub to confirm communication in the moment, that request can be any packet that elicits an immediate response from the device, indicating it is in a state to receive a further command.

From initialization, the hub proceeds to a home state 102. The servicing of devices already paired will ordinarily take priority over pairing end-devices, and according in its ordinary operating state the hub will first determine whether there are any already-paired devices that need to be serviced. If so, the hub enters a servicing state 104, performs various activities depending upon the end-device type getting present attention and other factors, and returns home 102 when finished. Otherwise, the hub enters a query state 106 in which the list of registered end-devices is checked for ones that are needing to be paired with and possibly assigned to an operational channel.

Conceptually, the list of registered end-devices provides a way to give each hub awareness of which end-devices should be serviced, as there may be end-devices owned or operated by others within radio locality that should be ignored. On a hub, this list can exist by itself or as a part of other data or structures. In a synchronous mode, this list is most simply a list of unique identifiers (UIDs) by which intended end-devices may be recognized and addressed. Ordinarily this list will also contain a flag or information that indicates whether a device is paired, and the channel to which the device is assigned or the parameters thereof. This list may, if desired, keep other information such as device types, times of previous communications, battery information, servicing requests, error information and many other things. The hub provides a way to edit and reconfigure this list, such that the list may be changed as end-devices are added to or removed from a desired system. In one example, a hub contains a network port, an HTTP server, and server software that permits the editing of the list through a browser on a connected network computer. In another example, the list is maintained as a file on a memory device that can be inserted into the hub where it can be read. In a third example, the hub has a proprietary port and protocol permitting a technician access to the list from a specially-designed programming tool. And in a cloud-based example, the hub may make an Internet query at determined times for changes to be made to the list, adding newly registered end-devices or redacting ones as needed. The way in which the list of registered end-devices can be accessed may be widely varied according to the specific form of the hub and interfaces provided therein.

When in state 106 the hub identifies a registered device needing to be paired, it moves to a new state 108 in which the unpaired device is queried. The choosing of an unpaired device to be serviced can be at random, or by another ordering method, for example one that prioritizes the channel assignment of security devices over others. Such a querying is by way of the default channel, and accordingly the hub changes the transceiver used to match the parameters of that channel. In state 108 an acknowledgment request packet is sent to the unpaired device, again on the default channel, which will result in either receipt of a packet acknowledging the request or a timeout. The acknowledgment packet contains an identifier of the destination end-device, which may be the device's unique identifier (UID). A timeout indicates that the unpaired device is off, out of range or unavailable in some other way, and accordingly no further transaction attempts with that device are needed. The hub returns to the home state 102 on a timeout.

If the end-device is listening in state 152 on the default channel and receives a packet from the hub identifying the device as the destination, the device responds within a set time with a return packet in acknowledgment. Upon receiving that acknowledgment packet, the hub moves from state 108 to state 110 where a channel assignment may be made. Now, a state 110 where a channel is assigned is optional, where channel assignments have been made previously. Channel assignments are dependent upon the particular end-devices to be used with a hub, among potential other things. One assignment scheme is to segment the devices between those that will tolerate communication latency from those that won't, and assign channels for the latter. Another scheme assigns channels to battery-operated devices so as to keep traffic to and from other devices off-channel, potentially saving power. Where channel assignments are made on-the-fly, as might be done if a state 110 is included, channel assignments can be made to ones that are least-populated Other assignment schemes can be crafted in accordance with the network environmental conditions, the devices used, and other factors as desired.

Upon determination of a channel assignment, the hub then enters a state 112 to attempt to communicate that channel assignment to the as-yet unpaired device. A command is sent to the end-device to make the channel assignment, which is now in or now enters state 154 to engage the new assignment. Note that this command may be received while the end-device is listening generally in state 152, if the communications protocol allows. The channel assignment command may either contain the channel parameters as explained above, or it may be a reference to the parameters, for example in a table of channels indexed by a number. Upon receiving that command, the end-device preferably sends back and acknowledgment to the hub that the channel assignment is accepted, following which its RF circuitry is configured for operation on the assigned channel. If non-volatile memory is available, the new channel assignment may be saved at the same time. Once the channel assignment has been put into effect, the hub and end-device then proceed to states 114 and 156, respectively. If there is any remaining setup to be done, it can be managed through communications on the assigned channel with the hub and end-device in those states.

It will sometimes be important for the hub to test a channel assignment periodically, which is a kind of guarantee that an end-device is active and communicating properly. In state 114 the hub sends a "ping" to the newly-configured end-device, on the newly assigned channel. After engaging the assigned channel to its radio transceiver, the end device maintains it communications 156 on the assigned channel, and in many cases uses the assigned channel for all further communication with the hub until a reset or until a further channel assignment is made. Any packet returning a packet in response can act as a ping, and the hub may send pings when it is in the usual paired device servicing 104. The failure to receive a ping at an end-device within a set time may cause it to enter a fail-safe procedure, essentially returning to state 152. Similarly, the failure of an end-device to return a packet in response within a set time may indicate a failure of that device to communicate in the assigned channel, and the list of registered end-devices can be updated to indicate that a device is no longer paired or a channel assigned. As conditions change in the radio environment, new channel assignments can be made by the hub for an end-device by the issuance of a channel assignment command on the presently assigned channel, or by waiting for a fail-safe event at the end device and then following the procedure of FIG. 8.

Figure 11:
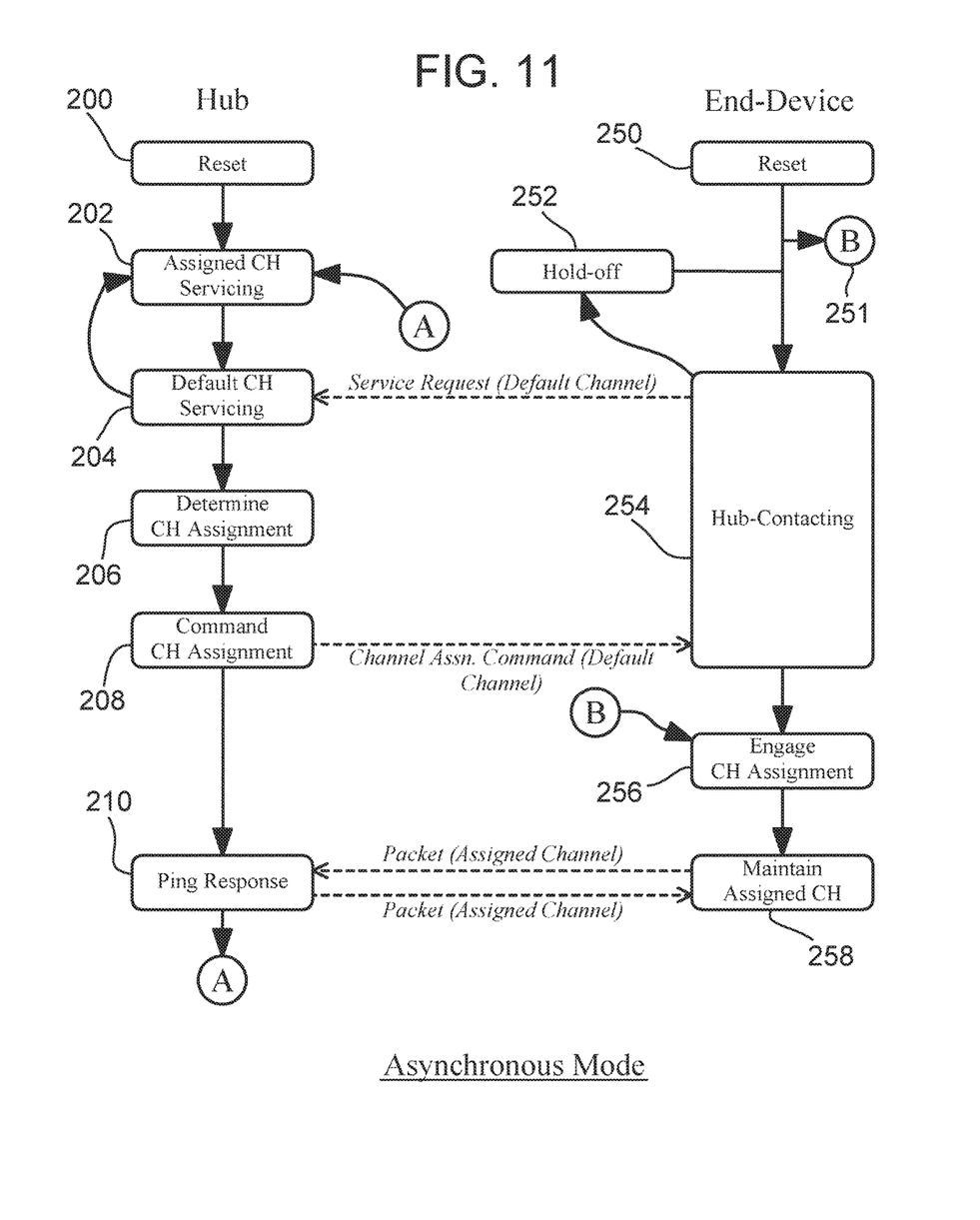
FIG. 11 depicts a typical set of states for a hub and an end-device being configured from a default initialization channel in asynchronous mode to operate on an assigned channel.

Now turning to FIG. 11, a channel negotiation is represented using an asynchronous mode. In this example, the hub has a single transceiver that can switch between channels. In asynchronous mode, the hub in a normal state 202 scans through the assigned channels, waiting for transmission of a packet from a paired end-device. In some encoding schemes, including FSK, a packet under transmission can be detected by the presence of a signal for a short time, perhaps the length needed to transmit a single symbol. Note that it isn't necessary to scan any unassigned channels, that is channels that are available but for which no end-device as been commanded to operate on. While scanning the assigned channels, the default channel must be left unserviced. Periodically, however, the default channel may be serviced 204. If no activity is detected, the hub may return to servicing the assigned channels 202.

The end-device starts from reset and initialization 250, and as in synchronous mode if a channel assignment is stored in non-volatile memory the device may skip 251 the channel assignment procedure, going straight to setting the RF electronics parameters appropriately 256. If no channel assignment can be determined at reset, the end device proceeds to a hub-contacting state 254, in which the device attempts to be serviced by the hub. The end-device transmits packets intended for the hub, those packets including a unique identifier and indicating the presence of the end device on the default channel. Immediately following a service request packet, the end-device listens for a response.

Now in asynchronous mode there are two main failure modes of communication. The first of these is caused by the hub not being ready to receive a packet on the default channel, either because it is set to receive on another channel or because it is servicing other processing needs at the time. The second of these is from collisions, that is other end-devices that happen to transmit packets at the same time as the one attempting to be serviced. Either way, if an end-device doesn't receive a packet from the hub within a set time, a hold-off state 252 is entered to give the failure mode a chance to clear. The end-device remains in hold off state 252 for a period calculated to be likely to avoid the failure mode, for example an exponentially-increasing period with some randomization to avoid other-device collisions, following which the end-device returns to the hub-contacting state 254.

Eventually, the end-device will be successful in sending a service request to the hub. First, the hub verifies that the end-device's UID is in a list of registered end-devices. If a packet is received that is from a non-registered device, it is assumed to be registered with a different hub and ignored, in which case the hub returns to state 202 to service devices on a different channel while the default channel is occupied. If a packet is received from a registered device, a channel assignment is then determined 206 for the end-device that requested service, which is similar to that in the synchronous mode, and if a channel assignment has been made, the hub need only look up the channel or its parameters. Once a channel assignment has been determined for the end-device, the hub proceeds to state 208.

The hub in state 208 sends a packet back to the end-device containing a command with the channel assignment or the parameters thereof. Ordinarily it will be important for this determination to be made quickly, so the channel assignment command packet is sent promptly to the end-device, which is waiting for it after having sent the service request. Note, however, that it is possible to utilize a Cloud-access for the reading of the registry or the channel assignment, provided the end-device is configured to remain in state 254 for a longer period of time (perhaps seconds) before proceeding to the hold-off 252. Upon receipt of a channel assignment command, the end-device proceeds to state 256 where it switches its RF circuits to the new channel. If non-volatile memory is available, the new channel assignment may be saved at the same time. When done, the end-device proceeds to a normal operational state on the assigned channel 258. Any remaining setup to be done can be managed through communications on the assigned channel with the hub and end-device in that state.

In an optional confirming mode of operation, the hub switches to the assigned channel and then waits for a period of time 210 for a packet to arrive on that assigned channel from the end-device. That packet can be a simple ping, or it can contain further information, requests or a command response from the end-device. Regardless of whether the channel assignment is confirmed, the hub returns to normal operation and state 202 for further end-device servicing. Where the confirming mode is used, it is preferred that the end-device wait for a short and fixed period of time calculated to allow for the reconfiguration of the RF circuits before sending that packet so the hub can confirm and resume without unnecessary delay.

The LoRaWAN protocol, particularly Classes A and B, use a mode of communication similar to the asynchronous mode described above, although only on a single channel with a single set of RF communications parameters. With the use of channel assignments comes a problem not experienced in LoRaWAN networks, which is this: where there are end-devices that do not store channel assignments in non-volatile memory, a power interruption can cause a large number of coinciding service requests for channel assignment, which for the asynchronous mode can flood the default channel and cause packet collisions and large delays in the restructuring of the intermittent network when power is restored. Furthermore, as in asynchronous mode end-devices are not ordinarily aware of each other, a prioritized channel assignment restoration can be difficult, potentially resulting in long periods of unavailability for critical devices. For this reason, where there are to be mains-powered end-devices that do not save their channel setting to non-volatile memory, the synchronous mode of communication is preferred.

Furthermore, even though a hub and an end-device may use a synchronous or an asynchronous mode of communication while using a default initialization channel, that mode may be varied after a channel has been assigned and set. This may be particularly helpful for devices that have urgent data to submit, such as security alarms or critical equipment failure messages. For example, a battery-powered perimeter end-device might initially use a synchronous communications mode on an initialization channel, following which it operates on an operational channel reserved for security alarms in asynchronous mode, transmitting wireless packets immediately and without prompting by a hub in the event of intrusion detection, continuing until a hub acknowledges receipt.

In the description above, communications are largely sent in the clear permitting interception of packet data, which may permit an outside party to snoop on the channel assignment activity and potentially to interfere with channel assignments of end-devices. In this way, a malicious party might inject unauthorized commands into the network (for example commanding door latches to open), snoop on the state of alarms, or commanding end-devices to switch to faux channels effectively disabling them. For this reason it is desirable to include security measures in the communication protocols to prevent this kind of attack. If LoRa-compatible hardware is used, then one security measure is to use a network session or application key, by which packets can be encrypted and unauthorized packets rejected. An additional security measure encrypts the UID of devices, such that all nodes on an intermediate network require possession of a key to decrypt the identity of the source or destination end-device; in this way the UID is never sent in-the-clear, making the acceptance of faux packets much more difficult for a malefactor to achieve. In another security method where digital spread-spectrum transmission is used, the frequency sequence is changed periodically by the hub, through a command to change channel parameters that include a new seed for the pseudo-random generator used to generate the sequence. A return to the default channel provides a fallback state in the event a hub and an end-device lose synchronization.

In a further variation, an assortment of default channels can be assigned and configured at the time of manufacture, selectable by the consumer at the time of purchase without a configuration step. In one example, hubs and end-devices are made with a default channel being selected from n preset ones, with each device being set at random, by an even distribution, or by some other scheme. The products are made available with different product codes or names, such that a purchaser can select the correct one with his desired default channel. For example, a purchaser having set up a hub on default channel 2 would purchase end-devices set to the same, and thus the step of configuring the default channel by the installer is avoided, while at the same time conveniently permitting several intermediate networks to reside in the same radio locality with minimal interference on their respective default channels.

End-Device Types and Determinations

End-devices may be classed by their functions, capabilities and other factors determining communication needs, which classes determine kinds of device "types" for the purposes of this disclosure. One kind of classification divides end-devices by those best suited for a synchronous or asynchronous mode of communication. Another classifies end-devices by priority of communication, ranking highest those devices which are more critical to operation, and those lowest where packets may be dropped or not responded to promptly. Another classifies end-devices by their need for bandwidth in operation. Another classifies end-devices by their ability to share a communications channel, or inversely their need in operation to consume the resources of a channel. Another classifies end-devices by their tolerance to communications latencies. These classifications may be varied from network to network and hub to hub, although it may be desirable for a manufacturer or other standards provider to set a default classification scheme for consistency and ease of installation.

Where there are a collection of channels available for assignment, it may be advantageous to assign those channels according to the need of the various devices, and according to the resources available on a hub. Although it is not necessary, it may be advantageous in a star-type network to have channel selections be made at such a hub. To facilitate that procedure, a list of end-devices and their needs and/or types may stored at the hub, or otherwise at the location where channel allocations are made. This list will vary from network to network, depending upon the end-devices used therein.

In perhaps the most simple procedure, a list of end-devices and corresponding types can be manually entered. There are, however, ways that this can be automated, sparing the installer the effort and removing potential error. In particular, where an end-device is provided with an initialization state where it can be queried by a hub, it can report type and need information. This information can be coded into an end-device at time of manufacture, such that it is available at power-on reset, by storing the information into programming or into the same memory as a serial number or other unique identifier. In a preferred method, a default initialization channel is used as taught above, and during the channel negotiation procedure an end-device receiving a channel assignment transmits type information. For example, it may be transmitted in the acknowledgment packet sent while an end-device is in state 152 on FIG. 10, or in the service request packet sent while an end-device is in state 254 on FIG. 11. Thus the hub may be provided with type information of an end-device shortly before a channel assignment is made.

In another method, device types are conveniently embedded within its unique identifier, avoiding a separate inquiry or transmission. For example, a UID might contain 32 bits. Twelve bits might contain a manufacturer's ID, 16 bits might be reserved for a serial number, and four bits might contain a type, in that example. At the time the UID is presented to the hub, for example at the time of registration, the hub decodes the type and makes an appropriate channel assignment.

Figure 12:
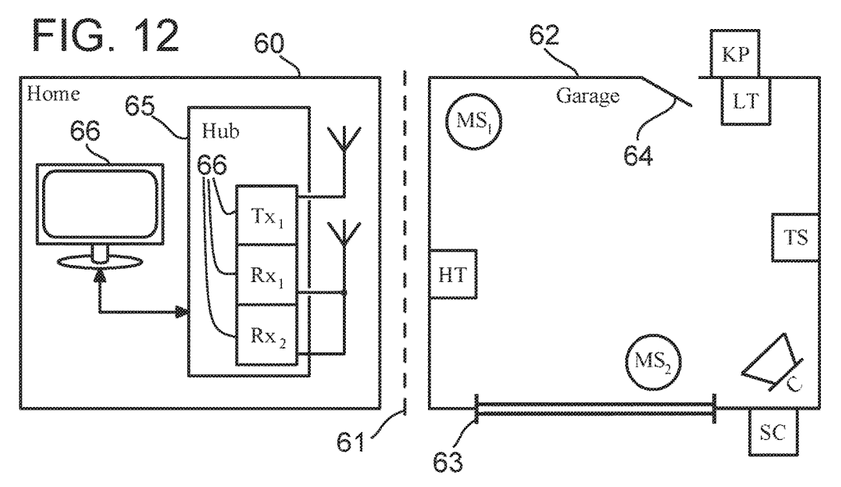
FIG. 12 shows an exemplary intermediate-range network having a multi-channel hub and several end-devices installed in a separate garage.

Now proceeding to FIG. 12, an exemplary system is presented using an intermediate network hub and end-devices from which the above teachings may be illustrated. A person, perhaps a classic car aficionado, resides at a home 60 and maintains at a garage 62 in the same city, separated by a distance 61 of hundreds of meters or more. Garage 62 has two openings, which are a carport 63 and an ordinary door 64. Garage 62 has no Internet service installed and, because of the distance, an 802.11b/g network will not service the space for a Zigbee or Z-Wave network from the person's home 60. To service the space, the person installs an intermediate-range hub 65 as described above in connection with FIG. 9, this hub having three transceivers 66 configured as one transmitter and two receivers.

Garage 62 is fitted with a number of end-devices, all capable of communication with hub 65 over the intermediate-range of distance 61. These are a keypad 70 located near door 64, a door latch controller 71 for that door, two motion sensors 72a and 72b, a camera 73, a temperature sensor 74, a heating controller 75, and a sprinkler controller 76, all of which are installed in operating order and in locations substantially as shown. Entered in the registry of hub 65 are the unique identifiers of all these end-devices, such that hub 65 can assign channels to all of them. Hub 65 can ascertain the type and needs of each end-device, through one of the methods described above. Using transceivers $Tx_1$ and $Rx_1$, hub 65 is capable of communication with two end-devices simultaneously while monitoring for asynchronous communication on an alert channel through $Rx_2$.

Figure 14:
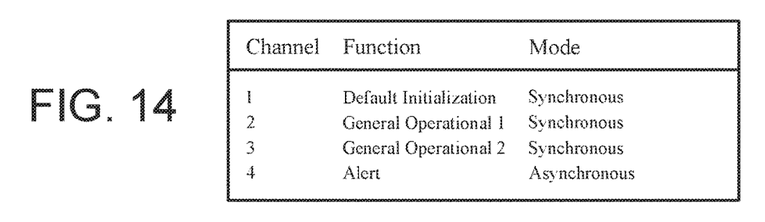
FIG. 14 shows a table containing several channels, usable by the hub of the exemplary garage installation.

Now turning to FIG. 14, the hub 65 as shown in FIG. 12 has an operating table of four channels 1-4, all orthogonal to each other. The parameters of each channel are preferably set to make communication as fast as possible while maintaining reliability. If each of transceivers 66 is a Semtech 127x, this can be done mainly by adjusting the spreading factor and the bit rate on each channel, and selecting frequencies that are clear. Because this hub 65 has only three transceivers, four channels is a reasonable number for this application. During operation transceivers $Tx_1$ and $Rx_1$ are configured for channels 1-3 as need dictates, and transceiver $Rx_2$ remains configured on channel 4 to receive alerts from end-devices in asynchronous mode. Because channels 1-3 are set for synchronous communication, hub 65 can regulate the communication with end-devices as needed so as to manage incoming communication flow. Keeping in mind that transceiver $Tx_1$ can be configured to receive, it is possible for hub 65 to receive communication on two synchronous channels simultaneously, if transceiver $Tx_1$ is operated in a half-duplex mode. Return throughput can be improved if the protocol used with the end-devices keeps outgoing packets from the hub small.

Represented in FIG. 14 is a table of the four channels used by hub 65. This channel schedule includes a default initialization Channel 1, where all end-devices start before channel assignments are made. The default initialization is preferably not used for ordinary operations, so as to leave it open for devices that have lost their channel assignment to recover quickly. Two synchronous channels are provided for general operations to end-devices; in this scheme Channel 2 is reserved for low-bandwidth devices, and Channel 3 for high-bandwidth ones. Channel 4 is reserved for devices that need asynchronous communication. Now this is, of course, one example of a channel schedule suitable for the application of FIG. 12, and it may be expanded upon or varied as needed. More particularly, where a hub had more receivers available for use, more channels could be handled and added to the schedule shown.

Figure 13:
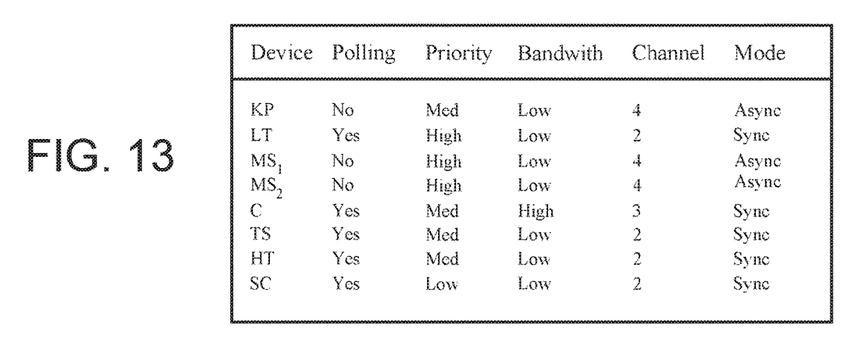
FIG. 13 shows a representative table of end-devices, including type information and channel assignments, registered at a hub in the exemplary garage installation.

FIG. 13 is representative of a table assembled at hub 65 after type information has been entered or read for the end-devices shown in FIG. 12, and after channel assignments have been made. As shown, for each end-device registered the hub may keep a device UID or other identifier, a channel assignment, a mode of communication, and type information for the end-device. In this example type information is composed of three qualities which are whether the end-device tolerates polling ("Polling"), a priority for communication ("Priority") of three levels, and bandwidth needs for the device ("Bandwidth") of high or low. Now addressing each end-device in the example, keypad 70 may expect to have information for the hub 65 only when a key is pressed, which may happen at unpredictable times. Key-presses will be need to arrive at the hub with low latency so that an appropriate action may be taken, here the unlocking of door 64, and as polling might introduce a long latency, it is classed into a Polling type of "no". Other kinds of user-input devices producing user feedback will likely share the same polling-tolerance type. The priority of communication with the keypad happens to be between others with higher and lower priority, so it is classed as "Med" in Priority type. The only information passing from keypad 70 to hub 65 will be occasional small bursts of keypad activity, so the keypad is typed with a Bandwidth of "Low". Needing asynchronous communication, keypad 70 is assigned to Channel 4.

Latch 71 is paired with keypad 70, such that hub 65 is programmed to send an "open" command to the latch when a certain combination is entered at the keypad. Communication for latch 71 will correspondingly be driven by timing at hub 65, and the Polling type for the latch is "yes" allowable. Door opening events are considered of high priority in this system, so that latch commands may be sent from the hub without delaying a person attempting to enter, and correspondingly the Priority for the latch is "high". Commands to unlatch or to read the open/close state of a latch require small and infrequent amounts of packet data, so the type Bandwidth for the latch is "low". Being tolerant of polling and having low bandwidth needs, latch 71 is assigned for synchronous operation on Channel 2.

Motion sensors 72a and 72b are configured to report an alert when motion is first sensed after some period of time of motion-absence, which might be for example ten seconds or one minute. Generally speaking, it will often be preferable to class security devices with high priority and low latency. For alerts generated at motion sensors 72a and 72b, prompt reporting is important so that the current state of activity within garage 62 may be known and appropriate action swiftly taken. In order for that to happen, the motion sensors cannot wait for a polling event, and correspondingly are typed with Polling class "no". Motion sensing events, being security events possibly needing an urgent alarm or notification action, are classed with a "high" Priority which the motion sensors inherit. Since the only data passing to and from motion sensors 72a and 72b are flags, transmitted infrequently, the motion sensors are classed in a "low" Bandwidth. Having an intolerance for polling, motion sensors 72a and 72b are assigned to Channel 4 so they may communicate asynchronously.

Speaking of security detection devices generally, which motion sensors 72a and 72b are, it may be preferable to assign channels to those devices such that a disturbance in one area does not cause a collision on a particular communications channel. In the example of FIG. 13 both motion sensors are assigned to the same channel, which causes some risk that a person entering the garage space would trip both at the same time, causing both to simultaneously transmit an alert and a packet collision. This kind of event can be avoided by assigning unique channels to security detection devices located within the same zone of detection, avoiding packet collisions and the delay associated with a back-off and retransmission procedure. In this example the risk of such a collision is accepted against the expense of inclusion of an additional receiver 66 in hub 65.

There is no spontaneous need for the camera 73 to transmit data to the hub 65, and it may be polled in synchronous mode by the hub. The transmission of images from camera 73 is of average priority, so the camera is classed at a "med" Priority. Images from a camera are, however, large chunks of data, indicating that an allowance should be made in the system for a "high" Bandwidth. Other examples of high bandwidth devices are those transmitting activity histories or error logs to the hub on-demand. In the arrangement of FIGS. 12 and 14, it is convenient to group devices of low bandwidth for an assignment on a common channel, reserving one channel for the high bandwidth of camera 63, allowing the camera to operate without interfering with communication with the other devices. Camera 63 is correspondingly assigned to be the sole occupier of Channel 3.

In the example of FIG. 12, heating controller 75 operates a furnace or other heating device, receiving commands from hub 65 acting as a thermostat, and using temperature sensor 74 to guide the times when that furnace should be on. As with most heating devices, minutes of operation are needed to affect a temperature change in a space such as that of garage 62, and responsiveness of a minute or so is adequate. Both sensor 74 and controller 75 can be operated in a polled mode with infrequent, small packets, and are typed Polling "yes", Bandwidth "low", and at a "med" Priority on Channel 2. This sensor 74 and controller 75 fall within a category of end-devices that sense changes at a slow rate, and devices within that category will generally be tolerant of long latencies.

Sprinkler controller 76 is a device programmable with the times when sprinklers to be operated, autonomously opening and closing valves according to that programming. A delay of many minutes or even hours is tolerable in its operation, so sprinkler controller occupies the "low" Priority class and the "yes" category for Polling. Only needing a few times sent for occasional programming, sprinkler controller 76 is classed in the "low" Bandwidth type. Having low bandwidth needs and being tolerable of latencies of communication in synchronous mode, sprinkler controller 76 is assigned for operation on Channel 2.

Thus a collection of end-devices may be controlled in a regular way by a hub at an intermediate range, even where that hub has a number of transmitters and receivers far less than the number of end-devices being serviced. The reader should note that the typing appearing in FIG. 13 and described above is only illustrative, and may be varied to better serve particular needs. For example, rather than having three classes of Priority, more classes may be assigned, even to the point that each end-device has a priority assigned relative to every other device in the network. Bandwidth needs can be an estimate of the number of bytes per packet and the frequency expected under normal or extreme conditions, allowing for a more thorough channel allocation at a hub. Other types, not described herein, may be determined, reported or assigned to further facilitate the operation of communication in a system to avoid unwanted delay and to efficiently allocate transceiver and channel resources.

It is possible that a collection of end-devices will include some that do not report type information, for example those that are made by a different manufacturer to a lower specification. The treatment of such non-reporting end-devices can be to a default type, perhaps assuming such devices to be tolerant of latency, low in bandwidth requirements, and low in priority. Provision can be made for the overriding of device typings stored at a hub, for example through an HTTP interface built-in or through a programming port. In that way an installer or an operator of a network of end-devices may retype devices where a prior classification is deemed to be unsatisfactory.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A hub designed for wireless communication with end-devices at intermediate ranges utilizing a set of discrete radio-frequency channels having at least partial orthogonality, each end-device being within communicative locality and having a unique identifier by which it can be distinguished from other end-devices, each end-device further having a type categorizing it as to its communicative needs, said hub comprising:

a radio-frequency transceiver functional for wireless communication over the set of discrete radio-frequency channels;

a memory wherein may be stored an end-device registry, an operating channel schedule, and a set of channel parameters corresponding to the contents of said operating channel schedule;

a port by which an end-device registry, an operating channel schedule and a set of channel parameters can be received; and an electronic circuit implementing a state machine immutable to power-transient events, wherein said state machine is configured to perform the functions of:
(a) initializing said electronic circuit and radio-frequency transceiver from a sleep-state into a-power-on state,
(b) determining device type information specific to each device listed in an end-device registry stored in said memory,
(c) for each registered end-device, making a channel assignment based upon the device type information determined for that end-device,
(d) recording a channel assignment for a registered end-device into said memory,
(e) communicating a channel assignment to a registered end-device, by way of said radio-frequency transceiver, and
(f) conducting communications with each registered end-device on the channel assigned, either receiving sensing information or sending commands for functions controlled by the end-device, or both.

2. The hub of claim 1, wherein the determining of device type information specific to a registered end-device is made directly from information contained in the unique identifier of that end-device.

3. The hub of claim 1, wherein said state machine is configured to perform the function of querying a registered end-device for type information, and wherein the function of determining device type information for a end-device is made from an answer to such a query.

4. The hub of claim 3, wherein a default initialization channel is used to communicate a query for type information to an end-device.

5. The hub of claim 1, wherein said state machine is configured to read type information stored within said memory, and further wherein the function of determining device type information is made from the type information read from said memory.

6. The hub of claim 1, wherein said state machine is configured to perform the function of determining device type information that indicates a tolerance or intolerance of polling delays in a synchronous communications mode.

7. The hub of claim 1, wherein said state machine is configured to perform the function of determining device type information that indicates a tolerance to being assigned a communications channel shared by other end-devices.

8. The hub of claim 1, wherein said state machine is configured to perform the function of determining device type information that indicates a tolerance to latency in communication.

9. The hub of claim 1, wherein said state machine is configured to perform the function of determining device type information that indicates a need to be assigned as the sole end-device to a communications channel.

10. The hub of claim 1, wherein said state machine is configured to perform the function of determining device type information that indicates a priority of communication between end-devices.

11. The hub of claim 1, wherein said state machine is configured to perform the function of determining device type information that indicates a device is or is not a security device.

12. The hub of claim 1, wherein said state machine is configured to perform the function of determining device type information that indicates the presence or absence of a need for high communications bandwidth.

13. The hub of claim 1, wherein a default initialization channel is used to communicate a channel assignment to each registered end-device.

14. An end-device operable to communicate with a hub utilizing a set of discrete radio-frequency channels having at least partial orthogonality, said end-device further having a type categorizing it as to its communicative needs, said end-device comprising:
a radio-frequency transceiver functional for wireless communication over the set of discrete radio-frequency channels;
a non-volatile memory wherein is stored a unique identifier and typing information corresponding to the communicative needs of said end-device;
one or more terminals or ports each operable to connect to a controller or a sensor; and
an electronic circuit implementing a state machine immutable to power-transient events, wherein said state machine is configured to perform the functions of:
(a) initializing said electronic circuit and radio-frequency transceiver from a sleep state into a power-on state,
(b) communicating the typing information stored within said memory to a hub,
(c) receiving packets specifically directed to said end-device,
(d) receiving from the hub an assignment of an operational channel within the set of operational channels,
(e) configuring said transceiver to communicate on an assigned operational channel,
(f) where said end-device implements a sensing function, reading a sensor connected to one of said terminals or ports,
(g) where said end-device implements a control function, sending a control signal at one of said terminals or ports, and
(h) conducting communications with the hub, either communicating sensing information received at said terminal or port to the hub, or receiving commands for control functions from the hub, or both.

15. The end-device of claim 14, wherein said typing information indicates a tolerance of said end-device to polling delays in a synchronous communications mode.

16. The end-device of claim 14, wherein said typing information indicates a priority of communication between said end-device and end-devices that may be in communication with the hub.

17. The end-device of claim 14, wherein said typing information indicates a need for higher or lower communications bandwidth.

18. The end-device of claim 14, wherein said typing information indicates a tolerance or intolerance of communication latency.

19. The end-device of claim 14, wherein said typing information indicates a tolerance or intolerance of sharing a communications channel with other end-devices.

20. The end-device of claim 14, wherein said end-device is configured to communicate typing information and receive a channel assignment over a default initialization channel.

* * * * *